United States Patent [19]

Matsuno et al.

[11] Patent Number: 5,050,381
[45] Date of Patent: Sep. 24, 1991

[54] MASTER CYLINDER WITH ADJUSTABLE LEVERAGE

[75] Inventors: Isao Matsuno; Masayuki Seki, both of Nagano, Japan

[73] Assignee: Nissin Kogyo Kabushiki Kaisha, Ueda, Japan

[21] Appl. No.: 580,744

[22] Filed: Sep. 11, 1990

[30] Foreign Application Priority Data

Sep. 13, 1989 [JP] Japan .................. 1-107610[U]
Sep. 18, 1989 [JP] Japan .................. 1-108726[U]
Jan. 23, 1990 [JP] Japan .................. 2-5018[U]

[51] Int. Cl.⁵ .................... B60T 11/30; F15B 7/10
[52] U.S. Cl. ........................ 60/584; 60/594; 188/344
[58] Field of Search ............. 60/533, 584, 594; 92/13.7, 13.8; 188/344, 24.22

[56] References Cited

U.S. PATENT DOCUMENTS

| | | | |
|---|---|---|---|
| 3,935,930 | 2/1976 | Kine | 60/584 X |
| 4,635,442 | 1/1987 | Bass | 60/584 X |
| 4,664,298 | 5/1987 | Shew | 92/13.7 X |
| 4,716,732 | 1/1988 | Tordoff | 60/584 |
| 4,800,725 | 1/1989 | Kaulig et al. | 60/584 |

FOREIGN PATENT DOCUMENTS 0109776 8/1980 Japan .................. 92/13.7

Primary Examiner—Edward K. Look
Assistant Examiner—John Ryzhie
Attorney, Agent, or Firm—Armstrong, Nikaido, Marmelstein, Kubovcik & Murray

[57] ABSTRACT

A master cylinder apparatus for a vehicle is adapted to be attached to a bar type steering handle. This master cylinder apparatus comprises a master cylinder attached directly or via a bracket to the bar type steering handle, an operating level pivoted on the bracket or a lever bracket of the master cylinder by means of a support shaft, an adjust bolt provided thrustable forward and backward to the operating lever, and a push rod having one end abutting on the rear end of a piston in the master cylinder and the other end pivoted on a free end of the adjust bolt. The forward/backward thrusting movement of the adjust bolt alters the distance between the support shaft and the point of action of the operating lever to the push rod, thereby changing the lever ratio of the operating lever to provide the operational feeling desired by a rider.

5 Claims, 5 Drawing Sheets

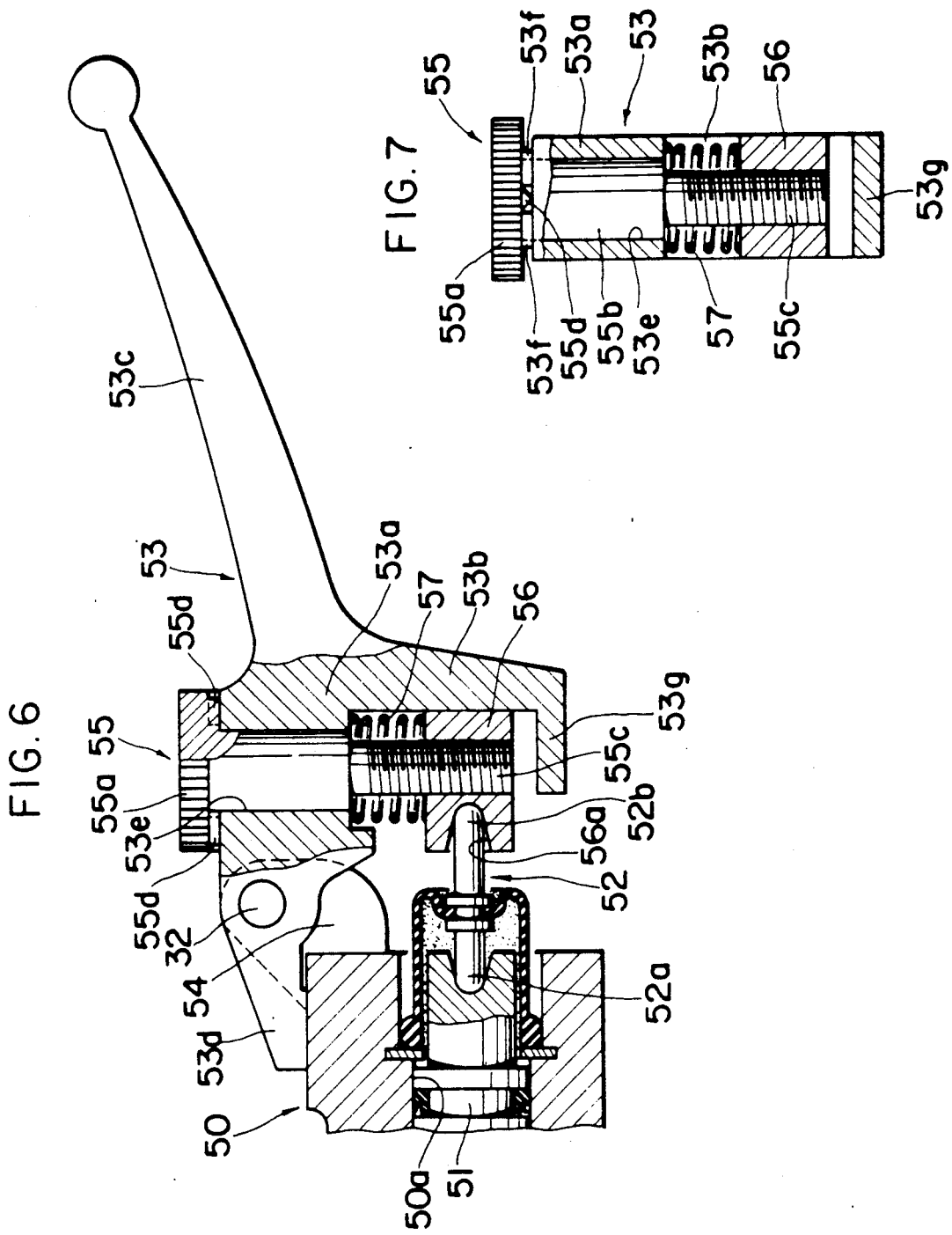

MASTER CYLINDER WITH ADJUSTABLE LEVERAGE

BACKGROUND OF THE INVENTION

1. Field of the Invention

The present invention relates to a master cylinder apparatus for vehicles, which is attached to a bar type steering handle. More particularly, this invention relates to an adjusting apparatus which can alter the operational feeling of the operating lever.

2. Description of the Related Art

A master cylinder for vehicles, which can change the operational feeling of the operating lever, is disclosed in Published Examined Japanese Utility Model No. 62-1834, for example. This master cylinder has an operating lever pivoted on its lever bracket and an adjusting pivot block provided rotatable at an urging arm of the operating lever; the pivot block serves to change the thrust amount of a push rod. The adjusting pivot block has a plurality of recesses with different depths formed therein. The push rod has one end abutting against the rear end of the piston of the master cylinder and the other end engaged with one of the recesses. Therefore, the stroke required for the free end of the piston to block the relief port of the master cylinder, i.e., the invalid stroke, can be varied by selecting one of the recesses, causing the push rod to engage with the selected recess, then changing the thrust amount of the push rod. This permits a rider to alter the amount of movement of the operating lever until the invalid stroke is released in order to select the desired operational feeling.

Although the above master cylinder permits selection among different operational feelings by changing the invalid stroke, it is not possible to alter the operating feeling caused by the reactive force of the piston which is generated upon generation of a liquid pressure to be transmitted to the operating lever.

SUMMARY OF THE INVENTION

It is therefore an object of the present invention to provide means to alter the lever ratio of an operating lever of a master cylinder apparatus for vehicles to thereby change the operational feeling produced by the reactive force of a piston at the time of generating a liquid pressure, which is transmitted to the operating lever.

According to one aspect of the present invention, there is provided a master cylinder apparatus for a vehicle comprising:

a bracket attached to a bar type steering handle;

a master cylinder disposed along a length of a vehicle;

a piston fitted movable in a liquid tight manner in the master cylinder;

a push rod having one end abutting on a rear end of the piston;

an operating lever pivoted on the bracket by a support shaft; and an adjust bolt provided thrustable forward and backward to the operating lever, one end of the master cylinder or the other end of the push rod being pivoted on the bracket, the other end of the push rod or the one end of the master cylinder being pivoted on a free end of the adjust bolt and abutting on an operating portion of the operating lever.

According to another aspect of the present invention, there is provided a master cylinder apparatus for a vehicle comprising:

a bracket attached to a bar type steering handle;

a master cylinder having one end or a body portion pivoted on the bracket and disposed across a vehicle;

a piston fitted movable in a liquid tight manner in the master cylinder;

an operating lever pivoted on the bracket by a support shaft;

an adjust bolt provided thrustable forward and backward to the operating lever; and a push rod having one end abutting on a rear end of the piston and an other end pivoted on a free end of the adjust bolt.

According to a further aspect of the present invention, there is provided a master cylinder apparatus for a vehicle comprising:

a master cylinder mounted to a bar type steering handle;

a piston fitted movable in a liquid tight manner in the master cylinder;

an operating lever pivoted on a lever bracket formed in the master cylinder, by a support shaft;

an adjust bolt fitted in the operating lever in a rotatable and engageable manner;

a pivot block member engaged with a free end of the adjust bolt and having a recess portion;

a spring disposed, compressed, between the pivot block and the operating lever; and a push rod having one end abutting on a rear end of the piston and an other end abutting on the recess portion of the pivot block member.

The forward/backward thrusting movement or the rotation of the adjust bolt can alter the distance between the support shaft and the point of action of the operating lever to the push rod, thereby changing the lever ratio of the operating lever to provide the operational feeling desired by a rider.

BRIEF DESCRIPTION OF THE DRAWINGS

FIGS. 6 and 7 illustrate a preferred third embodiment of a master cylinder for vehicle according to the present invention, FIG. 6 being a partly cross-sectional front view showing essential portions and FIG. 7 being a cross-sectional side view showing an adjust mechanism.

DETAILED DESCRIPTION OF THE PREFERRED EMBODIMENTS

Preferred embodiments of the present invention will now be described referring to the accompanying drawings.

Figure 1:
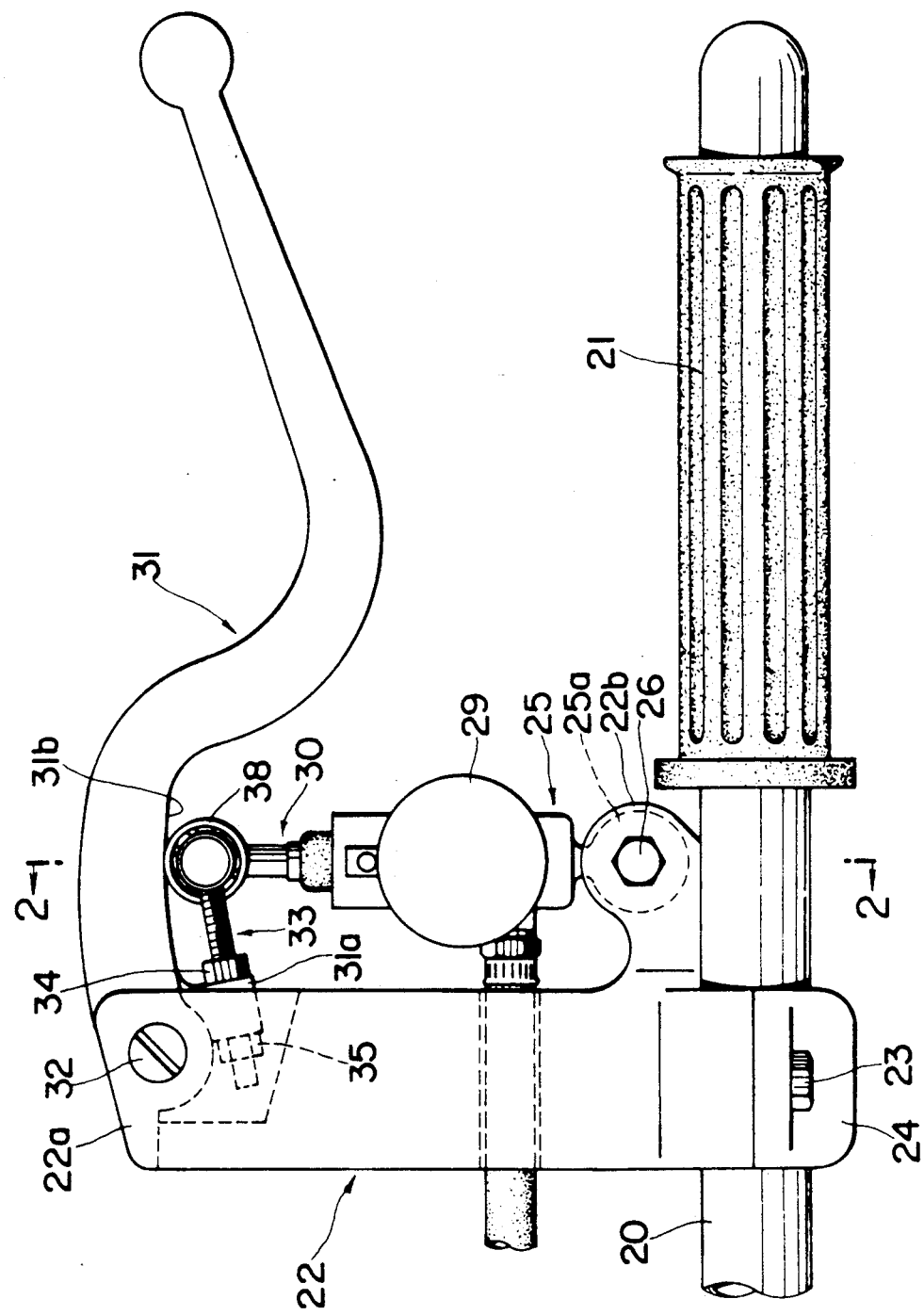
FIGS. 1 and 2 illustrate a preferred first embodiment of a master cylinder apparatus according to the present invention, FIG. 1 being a plan view and FIG. 2 being a cross section along the line 2—2 in FIG. 1.
Figure 2:
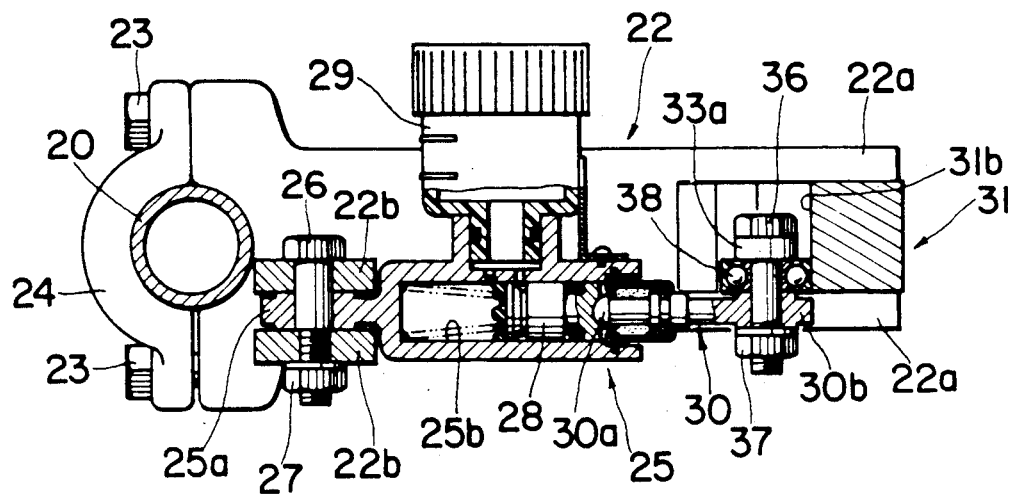

FIGS. 1 and 2 illustrate the first embodiment of the present invention.

A bar type steering handle 20 has a grip 21 provided at its either end. A bracket 22 extending frontward of a vehicle is attached to the steering handle 20 by means of a bolt 23 and an attaching member 24. This bracket 22 has a feed forked support portion 22a at its distal end and another feed forked support portion 22b extending towards the grip 21.

A master cylinder 25, which is disposed along the length of the vehicle, has at its one end an extending arm 25a pivoted on the feed forked support portion 22b of the bracket 22 by means of a bolt 26 and a nut 27. A piston 28 is fitted movable in a liquid tight manner in a cylinder 25b of the master cylinder 25. A reservoir 29 is provided at the upper portion of the master cylinder 25. A push rod 30 has its one end 30a abutting on the rear end of the piston 28.

An operating lever 31 is pivoted on the feed forked support portion 22a of the bracket 22 by means of a support shaft 32. An adjust bolt 33 is fitted in a boss portion 31a formed at the vicinity of the pivot portion of the operating lever 31, and is thrustable forward and backward by means of nuts 34 and 35. The adjust bolt 33 has a free end 33a pivotable on the other end 30b of the push rod 30 by means of a bolt 36 and a nut 37, with a bearing 38 fitted over the bolt 36 and disposed between this free end 33a and the other end 30b. The bearing 38 abuts on an operating portion 31b of the operating lever 31, which is formed on an imaginary arc having the bolt 36 as its center.

When the operating lever 31 rotates clockwise in FIG. 1, the operating portion 31b urges the push rod 30 through the bearing 38 and the master cylinder 25 moves around the bolt 26, moving the piston 28 forward, thereby creating a liquid pressure in the cylinder 25b.

To adjust the thrust amount of the adjust bolt 33, the nut 34 is loosen to cause the adjust bolt 33 to advance or retreat from the boss portion 31a of the operating lever 31 by a predetermined amount, then this bolt 33 is secured to the boss portion 31a by means of the nuts 34 and 35. The movement of the adjust bolt 33 by the predetermined amount alters the position of the bearing 38 abutting the operating portion 31b in the lengthwise direction of the operating lever 31. This varies the distance between the support shaft 32 and the bearing-abutting position of the operating portion 31b, thus making it possible to change the lever ratio of the operating lever 31.

As described above, altering the abutting position of the push rod 30 can change the reactive force of the piston 28 at the time of generating the liquid pressure, which is transmitted to the grip portion of the operating lever 31, without varying the stroke of the piston 28, making it possible to provide the operational feeling desired by a rider.

If the operating portion 31b of the operating lever 31 is formed straight substantially parallel to the bar type steering handle 20, the gap between the steering handle 20 and the operating lever 31 is altered with a change in the lever ratio, allowing the rider to select the proper grip gap for the rider's hands.

Figure 3:
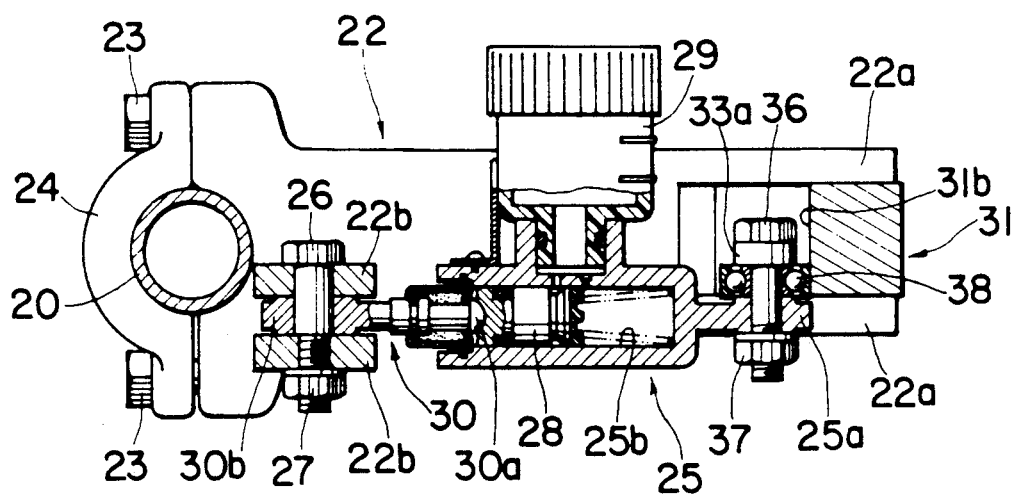
FIG. 3 is a cross section showing a modification of the first embodiment.

FIG. 3 illustrates a modification of the first embodiment.

According to this modification, the other end 30b of the push rod 30 is pivoted on the feed forked support portion 22b of the bracket 22 by means of the bolt 26 and nut 27, and the arm 25a at one end of the master cylinder 25 is pivoted on the free end 33a of the adjust bolt 33 by means of the bolt 36 and nut 37. The other structure and action are substantially the same as those of the first embodiment.

Figure 4:
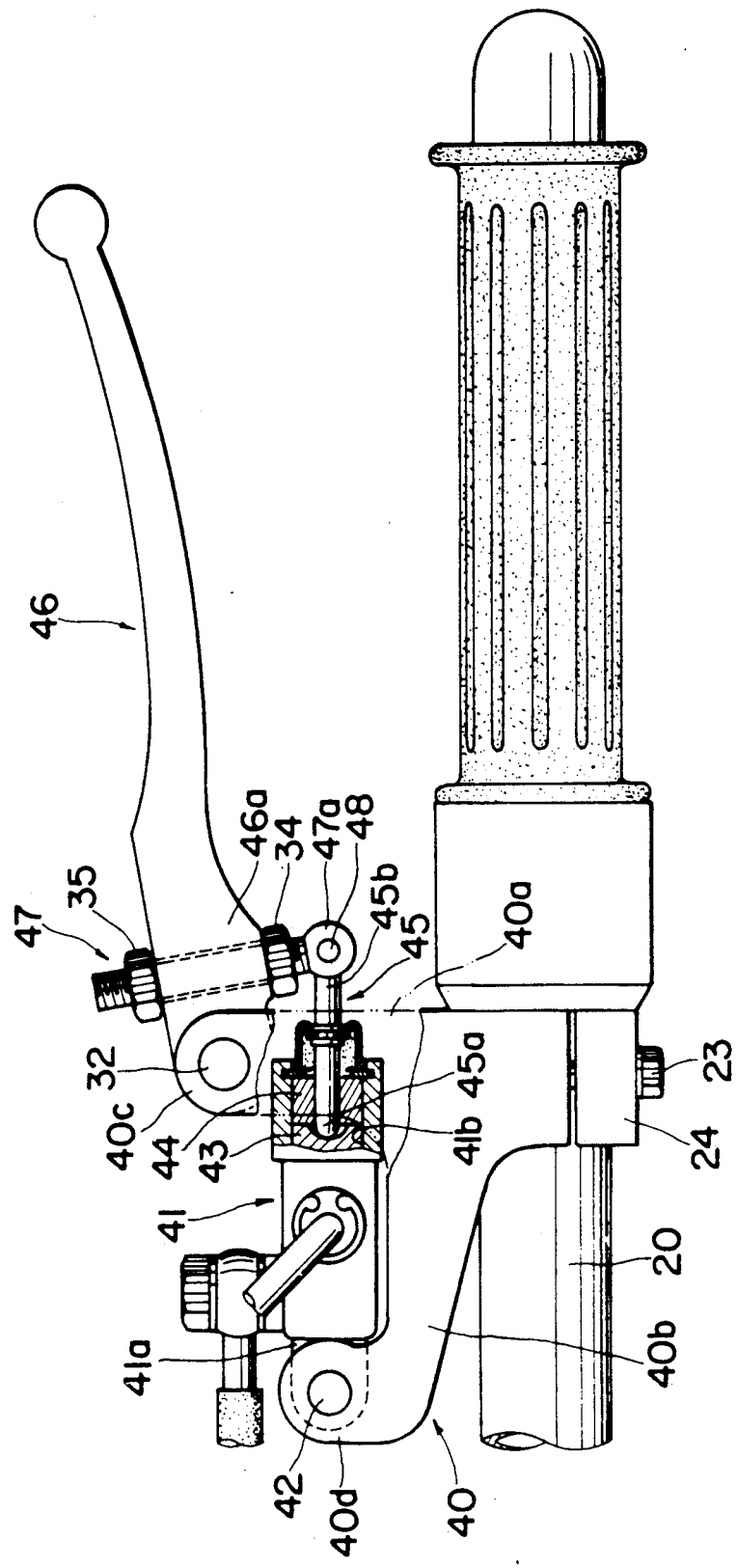
FIG. 4 is a partly cross-sectional plan view illustrating a preferred second embodiment of a master cylinder for a vehicle according to the present invention.

FIG. 4 illustrates the second embodiment of the present invention.

A bracket 40 is attached to the steering handle 20 by means of the bolt 23 and attaching member 24. This bracket 40 has an arm 40a extending frontward of a vehicle and an arm 40b extending toward the center of the steering handle 20. A support portion 40c is formed at the free end of the arm 40a, and another support portion 40d at the free end of the arm 40b.

A master cylinder 41, which is disposed across the vehicle, has at its one end an extending arm 41a pivoted on the support portion 40d of the bracket 40 by means of a pin 42. A piston 43 is fitted movable in a liquid tight manner in a cylinder 41b of the master cylinder 41. A guide bush 44 is fitted in the rear end of the piston 43. A push rod 45 has one end 45a penetrating the guide bush 44 and abutting on the rear end of the piston 43. The guide bush 44 prevents the push rod 45 from rocking.

An operating lever 46 is pivoted on the support portion 40c of the bracket 40 by means of the support shaft 32. An adjust bolt 47 is fitted in a boss portion 46a formed at the vicinity of the pivot portion of the operating lever 46, and is thrustable forward and backward by means of the nuts 34 and 35. The adjust bolt 47 has a free end 47a pivotable on the other end 45b of the push rod 45 by means of a pin 48.

When the operating lever 46 rotates clockwise in FIG. 4, the push rod 45 is urged through the adjust bolt 47 and the master cylinder 41 moves around the pin 42, moving the piston 43 forward, thereby creating a liquid pressure in the cylinder 41b.

The thrust amount of the adjust bolt 47 is adjusted in the same manner as done in the first embodiment. The forward or backward thrust of the adjust bolt 47 by a predetermined amount causes the master cylinder 41 to moves around the pin 42 to thereby alter the position at which the free end 47a of the adjust bolt 47 is linked to the other end 45b of the push rod 45. This varies the distance between the support shaft 31 and the link position of the free end 47a of the adjust bolt 47 and the other end 45b of the push rod 45, thus permitting alteration of the lever ratio of the operating lever 46.

As described above, altering the link position of the free end 47a of the adjust bolt 47 and the other end 45b of the push rod 45 can change the reactive force of the piston 43 at the time of generating the liquid pressure, which is transmitted to the grip portion of the operating lever 46, without varying the stroke of the piston 43, making it possible to provide the operational feeling desired by the rider.

Figure 5:
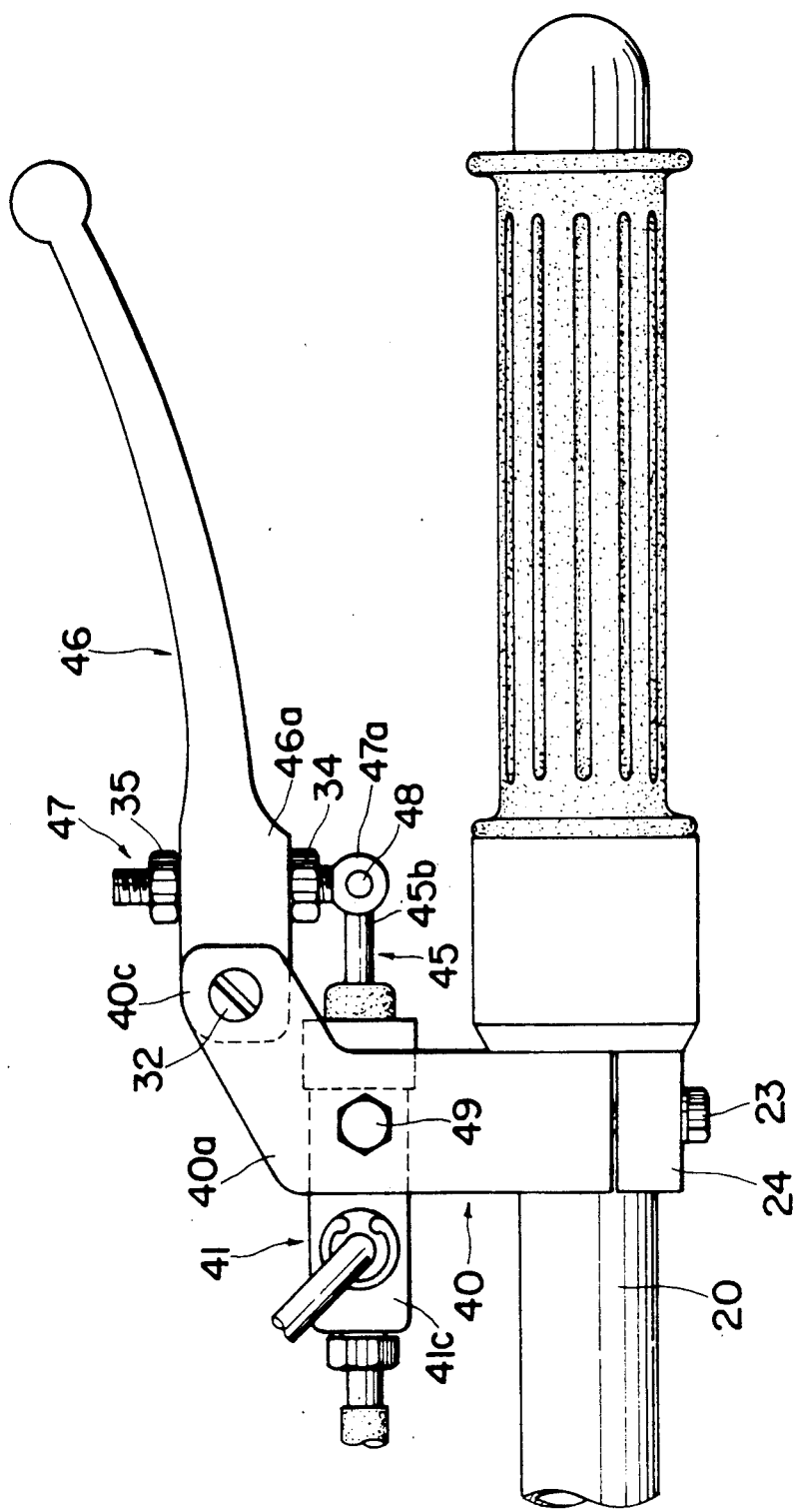
FIG. 5 is a plan view of a modification of the second embodiment.

FIG. 5 illustrates a modification of the second embodiment.

According to this modification, the master cylinder 41 has its body portion 41c pivotable on the bracket 40 by means of a support shaft 49. The bracket 40 in this modification does not have an arm extending toward the center of the steering handle 20. The other structure and action are substantially the same as those of the second embodiment.

FIGS. 6 and 7 illustrate the third embodiment of the present invention.

A master cylinder 50 is attached to an steering handle (not shown). The master cylinder 50 has a cylinder 50a in which a piston 51 is fitted movable in a liquid tight manner. A push rod 52 has one end 52a abutting on the rear end of the piston 51.

An operating lever 53 is pivoted on a bracket 54 of the master cylinder 50 by means of the support shaft 32.

The operating lever 53 has a boss portion 53a formed at the vicinity of the pivot portion, an operating arm 53b extending toward the rear end of the piston 51, a grip arm 53c extending from the vicinity of the boss portion 53a in a direction substantially normal to the operating arm 53b and a stopper arm 53d that restricts the return position of the operating lever 53.

An adjust bolt 55 is fitted in a rotatable and engageable manner in a bore 53e formed in the boss portion 53a of the operating lever 53. The adjust bolt 55 has a flat head portion 55a, a shaft portion 55b extending from the back of the head portion 55a to be fitted in the bore 53e, and a small-diameter shaft portion 55c extending from the shaft portion 55b and protruding from the bore 53e. The small-diameter shaft portion 55c has threads formed therein. The adjust bolt 55 further has a pair of projections 55d at the back of the head portion 55a, which engage with a pair of projections 53f formed at the boss portion 53a.

A pivot block member 56 having a recess 56a is engaged with the threads of the small-diameter shaft portion 55c. The back of the pivot block member 56 abuts on the operating arm 53b of the operating lever 53 to thereby restrict the rotation of the arm 53b. The other end 52b of the push rod 52 abuts on the recess 56a of the pivot block member 56. A spring 57 is disposed, compressed, between the pivot block member 56 and the boss portion 53a of the operating lever 53. Reference numeral 53g denotes a disengage stopper for the pivot block member 56.

When the operating lever 53 rotates clockwise in FIG. 6, the operating arm 53b urges the push rod 52 through the pivot block member 56 and the piston 51 moves forward, thereby producing a liquid pressure in the cylinder 50a.

To alter the lever ratio of the operating lever 53, pull out the adjust bolt 55 to disengage the projections 55d of the adjust bolt 55 from the projections 53f of the operating lever 53, then rotate the adjust bolt 55. The rotation of the adjust bolt 55 causes the pivot block member 56 to move the small-diameter shaft portion 55c upward in the axial direction of the adjust bolt 55. Returning the adjust bolt 55 to the original position changes the position of the pivot block member 56. This alters the distance between the support shaft 32 and the position of the pivot block member 56 abutting on the adjust bolt 55, thus permitting the lever ratio of the operating lever 53 to be changed.

As described above, altering the abutting position of the push rod 52 can change the reactive force of the piston 51 at the time of generating the liquid pressure, which is transmitted to the grip portion of the operating lever 53, without varying the stroke of the piston 51, thus allowing the operational feeling to be adjusted to the level desired by the rider.

What is claimed is:

1. A master cylinder apparatus for a vehicle comprising:
   a bracket attached to a bar type steering handle;
   a master cylinder having one end pivoted on said bracket;
   a piston fitted movable in a liquid tight manner in said master cylinder;
   an operating lever pivoted on said bracket by a support shaft;
   an adjust bolt provided thrustable forward and backward to said operating lever; and
   a push rod having one end abutting on a rear end of said piston and an other end abutting on an operating portion of said operating lever and pivoted on a free end of said adjust bolt.

2. A master cylinder apparatus for a vehicle comprising:
   a bracket attached to a bar type steering handle;
   an operating lever pivoted on said bracket by a support shaft;
   a master cylinder having one end abutting on an operating portion of said operating lever
   a piston fitted movable in a liquid tight manner in said master cylinder;
   an adjust bolt provided thrustable forward and backward to said operating lever and having a free end abutting on said operating portion of said operating lever; and
   a push rod having one end abutting on a rear end of said piston and an other end pivoted on said bracket and on one end of said operating lever.

3. A master cylinder apparatus for a vehicle comprising:
   a bracket attached to a bar type steering handle;
   a master cylinder having one end pivoted on said bracket;
   a piston fitted movable in a liquid tight manner in said master cylinder;
   an operating lever pivoted on said bracket by a support shaft;
   an adjust bolt provided thrustable forward and backward to said operating lever; and
   a push rod having one end abutting on a rear end of said piston and an other end pivoted on a free end of said adjust bolt.

4. A master cylinder apparatus for a vehicle comprising:
   a bracket attached to a bar type steering handle;
   a master cylinder having a body portion pivoted on said bracket;
   a piston fitted movable in a liquid tight manner in said master cylinder;
   an operating lever pivoted on said bracket by a support shaft;
   an adjust bolt provided thrustable forward and backward to said operating lever; and
   a push rod having one end abutting on a rear end of said piston and an other end pivoted on a free end of said adjust bolt.

5. A master cylinder apparatus for a vehicle comprising:
   a master cylinder mounted to a bar type steering handle;
   a piston fitted movable in a liquid tight manner in said master cylinder;
   an operating lever pivoted on a lever bracket formed in said master cylinder, by a support shaft;
   an adjust bolt fitted in said operating lever in a rotatable and engageable manner;
   a pivot block member engaged with a free end of said adjust bolt and having a recess portion;
   a spring disposed, compressed, between said pivot block and said operating lever; and
   a push rod having one end abutting on a rear end of said piston and an other end abutting on said recess portion of said pivot block member.

* * * * *